United States Patent
Agati (10) Patent No.: US 10,506,845 B2
(45) Date of Patent: Dec. 17, 2019

(54) RUBBER SHOE SOLE, MATERIAL, AND METHODS FOR MANUFACTURING THE SAME

(71) Applicant: DANSKO, LLC, West Grove, PA (US)

(72) Inventor: Salvatore P. Agati, Kennet Square, PA (US)

(73) Assignee: DANSKO, LLC, West Grove, PA (US)

( * ) Notice: Subject to any disclaimer, the term of this patent is extended or adjusted under 35 U.S.C. 154(b) by 167 days.

(21) Appl. No.: 15/842,277

(22) Filed: Dec. 14, 2017

(65) Prior Publication Data

US 2018/0168283 A1 Jun. 21, 2018

Related U.S. Application Data

(60) Provisional application No. 62/434,697, filed on Dec. 15, 2016.

(51) Int. Cl.

| A43B 1/10 | (2006.01) |
|---|---|
| A43B 13/04 | (2006.01) |
| A43B 13/10 | (2006.01) |
| B29D 35/12 | (2010.01) |
| A43B 13/12 | (2006.01) |
| A43B 13/18 | (2006.01) |
| A43B 13/02 | (2006.01) |
| A43B 23/22 | (2006.01) |
| A43B 1/14 | (2006.01) |
| B29K 75/00 | (2006.01) |

(52) U.S. Cl.
CPC ............... *A43B 13/04* (2013.01); *A43B 1/10* (2013.01); *A43B 1/14* (2013.01); *A43B 13/02* (2013.01); *A43B 13/10* (2013.01); *A43B 13/12* (2013.01); *A43B 13/122* (2013.01); *A43B 13/181* (2013.01); *A43B 23/22* (2013.01); *B29D 35/122* (2013.01); *B29D 35/128* (2013.01); *B29K 2075/00* (2013.01)

(58) Field of Classification Search
CPC ....... A43B 13/026; A43B 13/04; A43B 13/10; A43B 13/12; A43B 13/125; A43B 13/02; A43B 23/22; A43B 1/10; A43B 1/14
USPC .................. 36/25 R, 30 R, 30 A, 76 R, 32 R
See application file for complete search history.

(56) References Cited

U.S. PATENT DOCUMENTS

| 2,129,106 | A | * | 9/1938 | Rollmann | B29D 35/10 36/14 |
|---|---|---|---|---|---|
| 2,410,019 | A | * | 10/1946 | Davis | A43B 13/37 36/28 |
| 3,046,679 | A | * | 7/1962 | Maertens | A43B 13/04 36/17 R |
| 4,020,569 | A | * | 5/1977 | Fukuoka | A43B 1/0045 36/29 |
| 4,151,661 | A | * | 5/1979 | Namba | B29C 44/14 12/146 B |
| 4,399,620 | A | * | 8/1983 | Funck | A43B 7/28 36/28 |

(Continued)

*Primary Examiner* — Marie D Bays
(74) *Attorney, Agent, or Firm* — Cozen O'Connor (57) ABSTRACT

The present application relates to a rubber shoe sole, material and method for manufacturing the same. Disclosed a rubber sole comprising a rubber outsole filled with a high density material; wherein the high density material envelops a higher density TPU strip that is inscribed along the inner edge of the perimeter of the rubber sole and a rigid member enveloped between the heel and mid-sole portion of the sole.

15 Claims, 6 Drawing Sheets

(56) References Cited

U.S. PATENT DOCUMENTS

| | | | | |
|---|---|---|---|---|
| 4,439,937 A * | 4/1984 | Daswick | ............... | A43B 13/10 36/107 |
| 5,025,573 A * | 6/1991 | Giese | ................... | A43B 13/12 36/28 |
| 5,572,805 A * | 11/1996 | Giese | ................... | A43B 13/12 36/103 |
| 5,979,081 A * | 11/1999 | Vaz | ..................... | A43B 3/0026 36/107 |
| 6,226,895 B1 * | 5/2001 | McClelland | ............ | A43B 9/06 12/142 D |
| 6,713,006 B1 * | 3/2004 | Redin Gorraiz | ..... | A43B 13/026 264/154 |
| 7,062,865 B1 * | 6/2006 | Nordt, III | ............... | A43B 5/06 36/174 |
| 7,418,791 B2 * | 9/2008 | Cole, III | ............. | A43B 7/1415 36/25 R |
| 10,441,028 B2 * | 10/2019 | Smith | .................... | A43B 13/12 |
| 2005/0198863 A1 * | 9/2005 | Hockerson | .............. | A43B 5/06 36/30 R |
| 2018/0168283 A1 * | 6/2018 | Agati | .................... | A43B 13/04 |

* cited by examiner

RUBBER SHOE SOLE, MATERIAL, AND METHODS FOR MANUFACTURING THE SAME

CROSS REFERENCE TO RELATED APPLICATIONS

This application claims priority to U.S. Provisional Patent Application No. 62/434,697, filed Dec. 15, 2016, which is incorporated by reference in its entirety.

FIELD OF INVENTION

The present application is generally related to rubber soled shoes comprising a lightweight thermoplastic polyurethane ("Rigid PU") material and an inscribed Thermoplastic polyurethane ("TPU") layer for generating a rubber sole capable of being stapled to an upper. And also to a material generally, comprising a rubber portion, a Rigid PU material and a rigid TPU material enveloped by the expanding Rigid PU material.

BACKGROUND OF INVENTION

In the manufacture of conventional clog style shoes, the upper is stapled to a wooden or rigid plastic sole. The requirement to staple the shoe, thus requires that the sole is sufficiently rigid so that the staple enters the rigid frame and is maintained. Accordingly, use of materials such as soft foams and other materials have less density, such as those used in athletic shoes, are unsuitable, as they would prevent the ability to staple the upper to the sole.

Clogs are used in many industries for their stability, durability, comfort, and ability for cleanliness. Many people wear clogs in the medical industry, and other industries whom spend significant amounts of time on their feet during the day. The clogs or shoes, thus, are worn by individuals who walk significant distances during the day. A reduction in the weight of the shoe would reduce the overall effort exerted by an individual who wears clogs during the day.

The use of rubber as a sole material is also useful, as rubber has excellent traction and has a different weight and feel as compared to both wood and certain rigid plastics. However, rubber has to be typically adhered to a base sole when it is used. This has certain concerns with longevity as well as feel and wear of the sole, whether in a clog style shoe or in another style shoe.

SUMMARY OF INVENTION

The present invention provides for a lightweight sole comprising a rubber sole having a hollow heel and a raised edge defining a volume; the volume being filled with a liquid rigid polyurethane ("rigid PU"), a rigid shank, and an inscribed strip of TPU. The rigid shank and the inscribed TPU strip are embedded or enveloped into the rigid PU upon molding the material.

A further embodiment is directed towards a shoe sole comprising a rubber outsole having a concave opening filled with an expandable material having a first density; wherein the expandable material envelops a TPU material, said TPU material having a second density that is greater than the first density, said TPU material being inscribed inside of the inner edge of the perimeter of the rubber sole and, a rigid member enveloped between the heel and mid-sole portion of the sole.

In preferred embodiments, the expandable material is a rigid polyurethane (Rigid PU), having a density of between 0.25 g/cm$^3$ and 0.45 g/cm$^3$ and wherein the TPU has a density of between 1.15 g/cm$^3$ and 1.40 g/cm$^3$.

In preferred embodiments, the rigid member is made of a material selected from the group consisting of steel, nylon, a metal alloy, a plastic polymer, or combinations thereof.

A further embodiment is directed towards a material having a top, sides, and bottom, wherein the bottom and sides are a rubber material defining a void or recess; wherein the void is filled with an expandable material that is capable of expanding to fill the void and create the top; wherein enveloped by the expanding high density material is a higher density TPU material that is inscribed along at least the inner perimeter of the material.

A further embodiment is directed towards a material having a rubber outer layer, a Rigid PU filling, and an inscribed receiving material; said rubber outer layer having a first density and defining a concave receptacle having a top, sides, and a bottom; said rigid PU filling having a second density lower than the first density of the rubber outer layer and having properties to expand before solidifying; said inscribed receiving material having a third density, said third density being at least twice the second density.

In a preferred embodiment, the material having a rubber outer layer is a shoe sole, said rubber outer layer defining a toe, midfoot, and heel section, and wherein said shoe further comprising a rigid stabilizer, enveloped by the rigid PU filling, said rigid stabilizer extending from the heel section towards the toe portion of the sole.

In a preferred embodiment, the expandable material is a rigid polyurethane (Rigid PU), having a density of between 0.25 g/cm$^3$ and 0.45 g/cm$^3$ and the TPU has a density of between 1.15 g/cm$^3$ and 1.40 g/cm$^3$.

Preferable these materials are further defined by a hardness, wherein the expandable material has a Shore C hardness of between 85-90, and wherein the TPU has a Shore D hardness of between 50 and 55.

In a preferred embodiment, the rubber outer layer of the products described herein has a density of between 0.85 and 1.00 g/cm3, and a Shore A harness of between 65 and 70.

In a preferred embodiment, instead of a shoe, the material is manufactured in a planar sheet.

A method for manufacturing a rubber sole comprising: molding a rubber outer layer, from a rubber material, said rubber outer layer having a bottom, a side wall along the perimeter of the outer layer, and a heel portion, said side wall and heel defining a concave portion; filling into the concave portion of the rubber outer layer an expandable material; attaching to a top portion of a mold a TPU material and a rigid stabilizer; and molding said expandable material with said rubber outer layer, wherein said expandable material envelopes said TPU material and said rigid stabilizer.

In a further embodiment, the top portion of said mold comprises a plurality of prongs, said prongs extending into the concave portion of the sole and creating an indentation in the molded sole.

In a further embodiment, said rubber outer layer has a density of between 0.85 and 1.00 g/cm3, and a Shore A harness of between 65 and 70; wherein said expandable material is a polyurethane and has a Shore C hardness of between 85-90 and comprises a density of between 0.25 g/cm$^3$ and 0.45 g/cm$^3$, and wherein the TPU has a Shore D hardness of between 50 and 55 and a density of between 1.15 g/cm$^3$ and 1.40 g/cm$^3$.

A further embodiment is directed to a process for manufacturing rubber heeled sole having an inscribed strip of TPU and a Rigid PU filler comprising:
  a. molding a rubber sole having a volume to accept a material;
  b. filling the volume with a rigid PU material;
  c. placing the rubber sole into the bottom of a mold having a bottom and a top mold;
  d. attaching to the top mold a strip of TPU positioned to inscribe the inner perimeter of the sole and a rigid shank running between the midfoot and the sole along the longitudinal axis of the shoe (from heel to toe); and
  e. molding the sole; wherein the rigid PU expands to envelop the TPU and the rigid shank; and wherein the rigid PU and the rubber sole are mechanically and chemically bonded together to form the rubber based sole.

A further embodiment is directed towards a rubber sole comprising a rubber outsole filled with an expandable polyurethane material; wherein the expandable polyurethane material envelops a higher density TPU strip that is inscribed along the inner edge of the perimeter of the rubber sole and a rigid member enveloped between the heel and mid-sole portion of the sole. Wherein, in certain embodiments, the expandable polyurethane material is a rigid polyurethane (Rigid PU), has a density of between 0.45 g/cm$^3$ and 0.6 g/cm$^3$ when formed; and certain embodiments, the TPU has a density of between 0.9 g/cm$^3$ and 1.0 g/cm$^3$; and in certain embodiments, the rigid member is steel.

Another embodiment is directed towards a material having a top, sides, and bottom, wherein the bottom and sides are a rubber material defining a void; wherein the void is filled with an expandable polyurethane material that is capable of expanding to fill the void and create the top; wherein enveloped by the expandable polyurethane material is a higher density TPU material that is inscribed along at least the inner perimeter of the material. In certain embodiments, the material is a shoe sole and further comprises a heel, a mid-foot and a toe section, wherein a rigid member is enveloped in the expandable polyurethane material extending from the heel through the mid-foot. In other embodiments, the material is manufactured in a planar sheet, such as an 8'×4' sheet.

In further embodiments, the development of certain materials, e.g. sheet like materials, it may be suitable for having a rubber based side, but wherein it is necessary to affix the material to another through fastening means; the material comprises a rubber portion, a low density expanding polyurethane and a rigid TPU that inscribes the inside perimeter of the material; wherein the density of the rigid TPU is sufficient to hold a nail, staple, screw or similar fastening material.

DETAILED DESCRIPTION OF THE EMBODIMENTS

As used herein, the term "Rigid PU" refers to a poured polyurethane material that can be molded in varying densities. For example, a lightweight thermoplastic polyurethane such as BPU. The BPU in preferred embodiments has a Shore C hardness of between 85-90 and a density within the range of between 0.25 and 0.45 g/cm$^3$, and preferably between 0.30 and 0.35 g/cm$^3$.

As used herein, the term "TPU" refers to thermoplastic polyurethane that can be injected or molded with a rigid density that provides support and a foundation for stapling. The TPU preferably has a Shore D of between 50 and 55, and a density of between 1.15 and 1.40 g/cm$^3$, and preferably a density between 1.20 and 1.30 g/cm$^3$, and more preferably about 1.22 to 1.25 g/cm$^3$.

As used herein, hardness is determined on an ASTM scale D2240-00 having a total of 12 scales including Shore A, C, and D as used herein. Each scale has a value between 0 and 100, with higher values indicating a harder material. Those of skill in the art will recognize this set of standards.

In the footwear industry, and specifically for clog style shoes, stapled construction, between the sole and the upper is a common method of construction. That is, a staple or nail is pressed through the upper and into a portion of the sole, which holds the upper in secure fashion. Historically, for clogs that meant a wooden sole, which easily accepted a staple or nail and held the upper securely. More modernly, certain polyurethane materials have also been used. However, certain low density material, such as EVA—frequently used for running and athletic shoes—as well as Rubber—frequently used for soles of certain work boots—do not have sufficient density to hold a nail or staple. Accordingly, the stapled construction was not typically an option when using such materials. Here, we describe a sole and methods of manufacture of said sole, that allows for a rubber sole, a lightweight Rigid PU, and a TPU layer, inscribed within the Rigid PU, to generate a sole having a layer capable of accepting a nail or staple with a rubber sole.

Embodiments of the invention describe a lightweight rubber sole and methods of manufacturing the same. The sole comprises a rubber exterior perimeter defining a cavity, the cavity is then filled with the lightweight rigid PU. As the rigid PU is poured into the cavity, a rigid member and a strip of inscribed TPU are positioned to be enveloped by the expanding rigid PU, wherein through a molding process, the materials are molded together and solidified to form a sole having a rubber bottom molded to the rigid PU and having an inscribed strip of TPU and the rigid member enveloped by the rigid PU. This provides for a completely new sole that is capable of being attached to an upper by staple, nail or the like, because of the density of the TPU, while also reducing weight of the sole/shoe by use of the lightweight Rigid PU.

A typical problem with using both rubber and a light weight or low density urethane material is that each does not possess the sufficient density to hold a nail or staple or similar attachment mechanism. Thus, it is necessary to manufacture the material in a manner such that a sufficiently high density material is embedded into the material to allow for the nail or staple to be affixed thereto. Thus, by taking a rubber exterior having a cavity therein, filling the cavity with the Rigid PU (being lightweight, but also having some rigidity), and embedding into the Rigid PU, a higher density material sufficient to hold a nail or staple, provides for a new material.

Figure 1A:
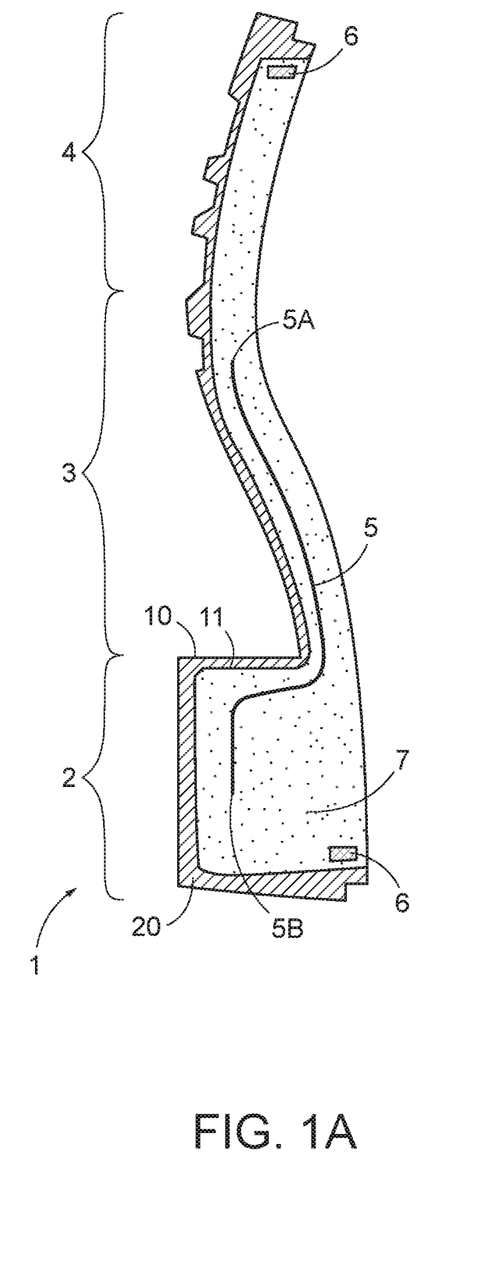
FIGS. 1A-1B depict a side and top profile of a sole.

The rubber sole, as depicted in FIG. 1A shows a cross sectional view of the sole 1. The toe portion 4, the mid foot portion 3, and the heel portion 2 of the rubber outsole 20 are all made of rubber on the bottom and outside of said sections. However, the rubber outsole 20 portion is only the outermost layer. This rubber outsole 20 has an inner surface 11 and an outer surface 10. The inner surface 11 opens to define a void or cavity having a volume that can be filled with a further material. Accordingly, the rubber outsole 20 portion functions as a reservoir, having merely an exterior shell that can be filled with a further material. The rubber outsole 20 preferentially has a Shore A hardness of between 65 and 70 and a density of between 0.85 and 1.00 g/cm$^3$, and preferably between 0.90 and 0.95 g/cm$^3$, and more preferably between 0.92 and 0.95 g/cm$^3$.

Preferably the void is filled with a low density expandable material 7. The material is chosen for several reasons. First, rubber is a generally heavy material and if the entire sole was just solid rubber, it would be heavy for daily wear. Second, rubber is highly flexible and thus does not have a lot of structure. Use of a material that has a higher rigidity than the rubber (measured by ShoreA) as well as a lower density material, allows for both an increase in the structure or rigidity of the now filled sole, as well as a weight reduction. For example, suitable materials include rigid PU, EVA, and other similar materials. These materials have a density with the ranges as provided above for the rigid PU.

These materials alone, however do not possess the necessary density to accept a nail or a staple and thus a further material is necessary to allow for this type of construction. By comparison, the TPU has a greater density, allowing it to retain the nail or staple. TPU has a holding force of about 50 kilos (kg), for a staple in the density range of 1.20 and 1.30 g/cm$^3$. By placing a strip of TPU into the Rigid PU, a small strip of higher density material is molded into the sole. Accordingly, when fastening an upper to the now created rubber sole, staples can be driven through the upper and into the TPU strip to hold the upper in place. Absent this strip of TPU, the materials of the Rigid PU or rubber would not have sufficient density to provide a sufficient holding force to enable such construction.

The sole is manufactured by first generating a rubber sole exterior. For example, a first process can mold rubber into the shape of the particular structure, and defining therein a cavity to be filled. For example, in FIG. 1A, the side profile shows the rubber outsole 20 as the exterior, which defines a cavity that is filled with an expandable material 7. After the exterior rubber outsole 20 is molded, the rubber sole is preferentially placed in a mold having a top 32 and a bottom 31 portion (See FIGS. 5 and 6). The bottom portion 31 of the mold holding the rubber outsole 20, is positioned to allow for the liquid expandable material 7 to be poured into the void. A top 32 portion of the mold then comprises retaining means for retaining a strip of TPU 6, and a rigid member 5. The TPU 6 is inscribed just inside of, but not to touching the inner surface 11 of the sole. Accordingly, a small portion 8 of the poured expandable material 7 is between the inner surface 11 and the TPU 6. As the poured expandable material 7 expands, it will surround the TPU 6 as well as the rigid member 5. The side profile FIG. 1A depicts these features.

Figure 1B:
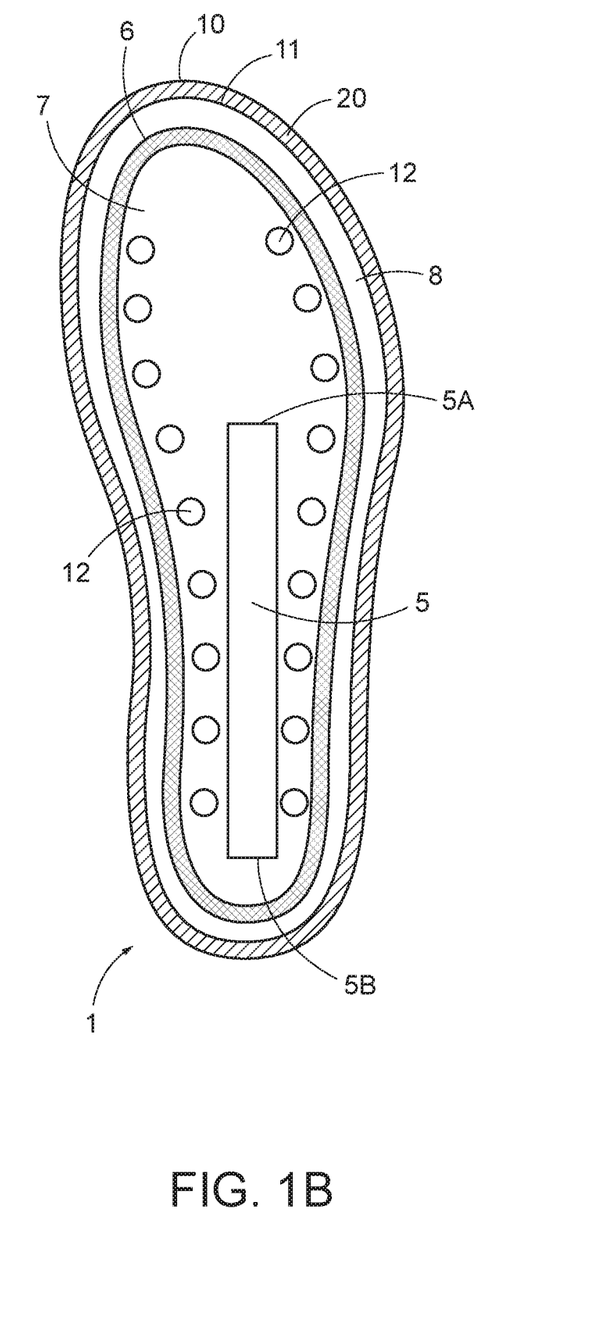

The rigid member 5 has a mid-foot end and a heel end 5, wherein the heel end 5B of the rigid member is placed centrally in the heel and the heel end 5B is positioned about half way between the front and rear of the heel, and the mid-foot end 5A extends towards about the front of the arch portion of the sole. The general positioning can be seen in FIGS. 1A and 1B. The rigid member is preferentially made of a lightweight material that is rigid. Suitable materials include metals, nylon, and other plastics or polymers that can provide properties similar to steel. This material provides for a flex and stability to the formed shoe Indeed, FIG. 1B provides a clear top down view of the inscribed strip of TPU 6 and its placement within the sole. As depicted in FIG. 1B, the rubber outsole 20, has an outer edge 10 and an inner surface 11 creating the thickness of the rubber sole. Then a small portion 8 of the poured expandable material 7 is spaced between the TPU strip 6. The entire portion of the sole inside of the inner surface 11, is a void or cavity having a particular volume based on the size of the sole 1.

The volume changes with the size of the sole. Larger shoes need a larger sole and thus a larger sole will have a greater volume. So, for example, a size ten shoe will have a larger volume than a corresponding size seven (a smaller size) shoe. The amount of expandable material 7 that is needed to fill that volume can be calculated by a formula, based upon the goal density of the heel. In the molding process, adding more expandable material 7, can allow for a greater resultant density after molding than if less material was utilized. Indeed, the expandable material 7 expands to fill the cavity once poured and the molding process begins. This allows for the expandable material 7 to expand and envelop the TPU strip 6 and the rigid member 5 that are held into place by the top of the mold.

Figure 5:
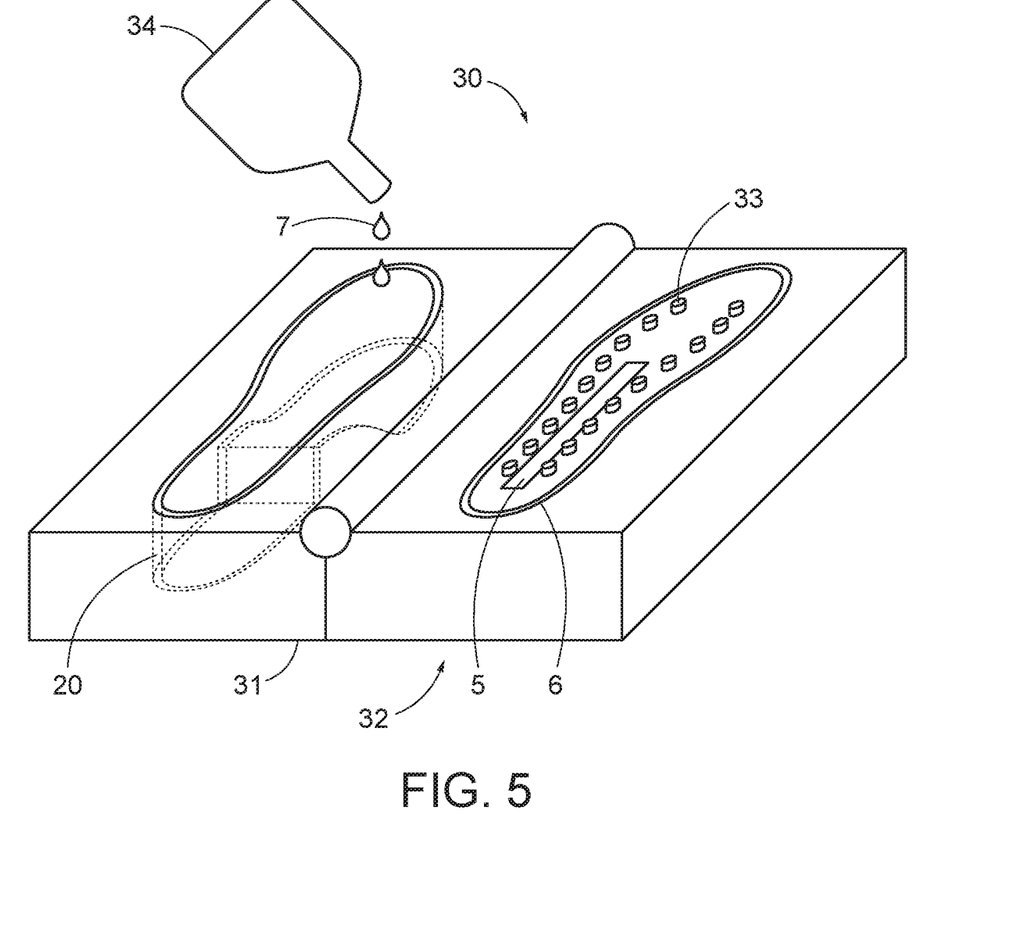
FIG. 5 depicts a mold having a bottom and top portion for molding a rubber sole.
Figure 6:
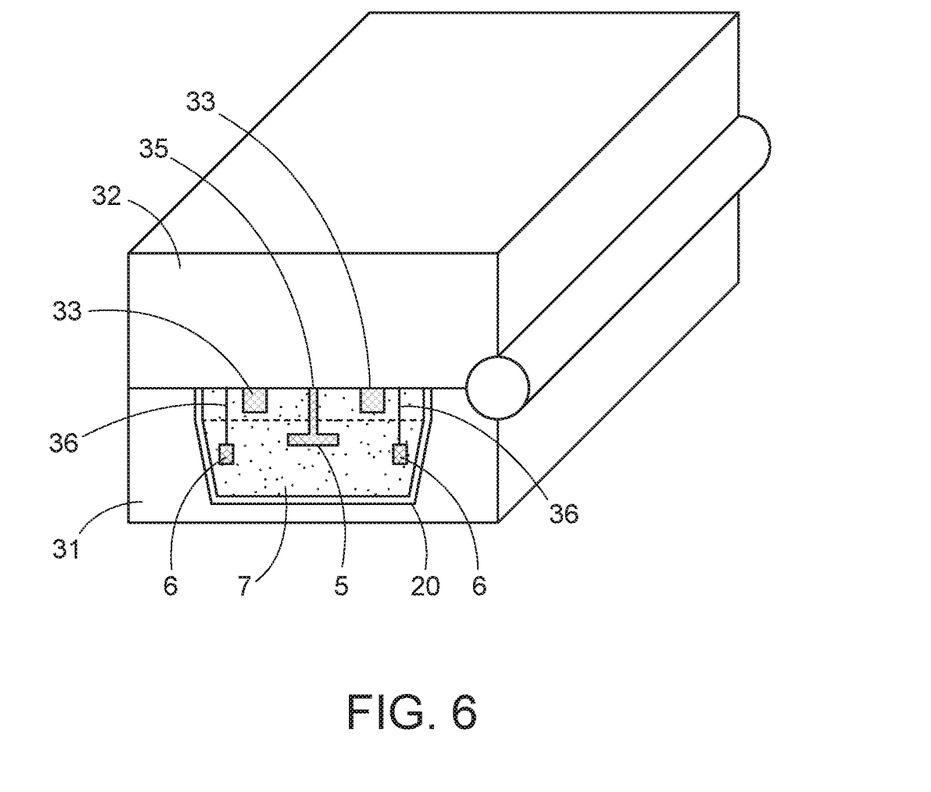
FIG. 6 depicts a mold in closed position molding a rubber sole.

The mold also provides for holes or indentations 12 on the top surface of the molded sole. These indentations provide for weight reduction as well as for flexibility of the sole. Additional holes can be added or removed from the surface based upon the size of the sole 1, the need for additional support, or the need to reduce weight, as a non-limiting list of examples. The mold 30 as depicted in FIGS. 5 and 6 can be formatted to include any number of indentation prongs 33, of varying depths to assist in the weight reduction or to modify the flexibility of the sole.

The result is that after molding, some of the expandable material 7 expands out of the mold and can be cut away. However, by allowing for the expansion of the material, the expandable material 7 has completely enveloped the TPU 6 and the rigid member 5 so that they are held in the sole 1.

Figure 2:
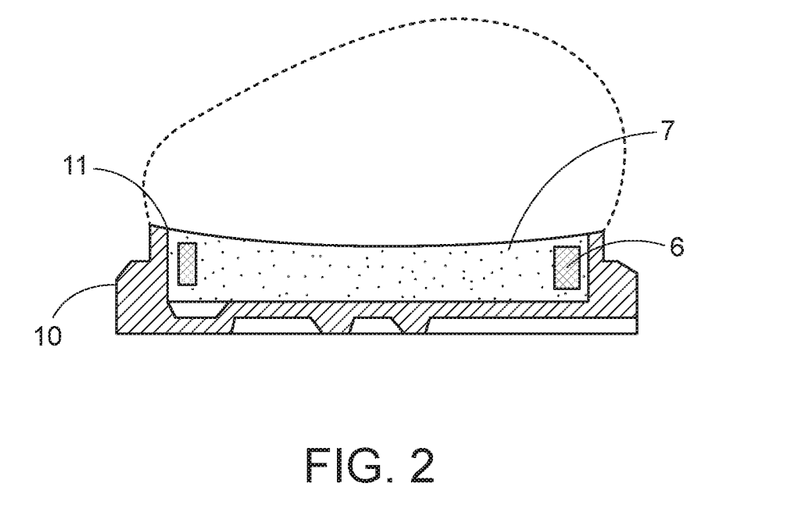
FIG. 2 depicts a cross sectional view at the toe portion of the sole.

FIG. 2 depicts a toe portion 4 of the sole in a cross sectional view along the lateral dimension of the sole 1. This clearly depicts the filled expandable material 7, the outside edge 10 and inside edge 11 of the rubber outsole 20, and the TPU strip 6.

Figure 3:
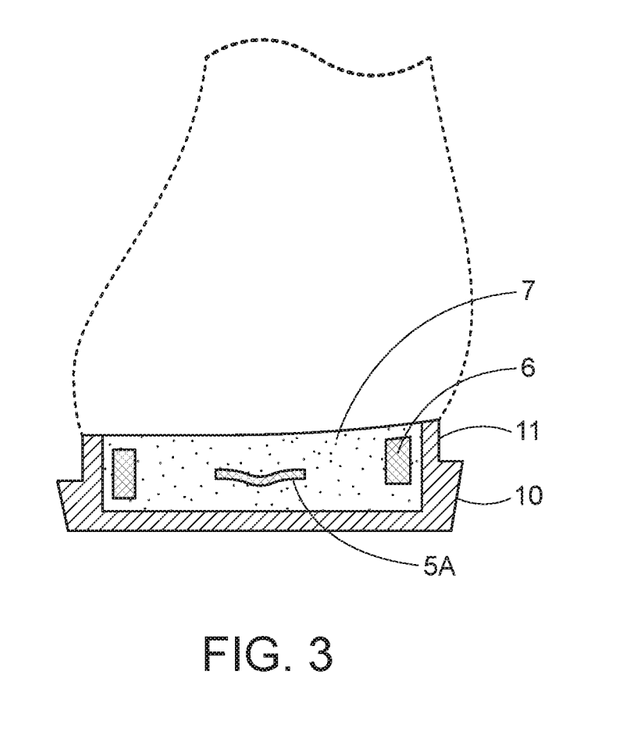
FIG. 3 depicts a cross sectional view at the mid foot of the sole.

FIG. 3, drawing from FIG. 2 is a cross sectional view at the middle 3 of the sole, again depicting the expandable material 7, the outside edge 10 and inside edge 11 of the rubber and the TPU strip 6. However, also depicted is the front edge 5A of the rigid member 5.

Figure 4:
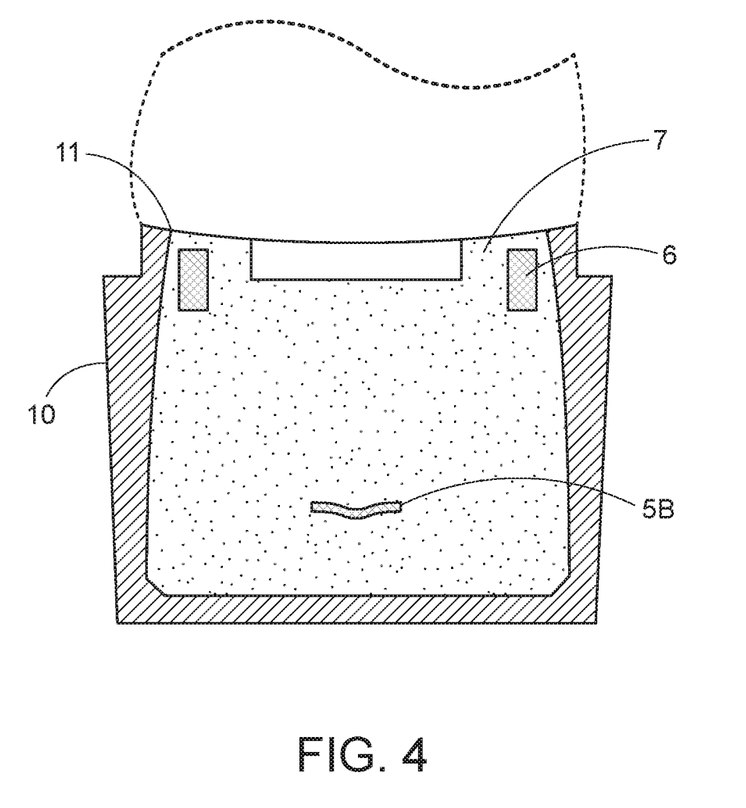
FIG. 4 depicts a cross sectional view at the heel of the sole.

FIG. 4 depicts a cross sectional view of the heel portion 2 of the sole. The heel portion 5B of the rigid member 5 is depicted, as is the strip of TPU 6 and the expandable material 7 disposed inside of the exterior rubber outsole 20.

FIG. 5 depicts a mold 30, having in the bottom portion 31 of the mold the exterior rubber outsole 20. A container 34 is pouring the liquid expandable material 7 into the void in the rubber outsole 20. The top portion 32 of the mold shows a plurality of indentation prongs 33, as well as the TPU material 6 and the rigid member 5 attached thereto. Once the expandable material 7 is filled into the rubber outsole 20, the mold can be closed, as depicted in FIG. 6.

FIG. 6 shows the mold in said closed position. A holding feature 35 holds the rigid member 5 into proper place, while a second holding feature 36 places the TPU 6 into proper position. The indentation prongs 33 are shown extending from the top 32 and extending into the expandable material 7, which creates the holes 12 as visualized in FIG. 1B. After molding, the mold can be opened and the sole is ready to be trimmed. Certain of the expandable material 7 may overflow and can be trimmed off. Finally, an upper can be affixed to the now finished sole. The particular type of mold and the container 34 for injecting or pouring the expandable material 7 can be modified by those of skill in the art.

Interestingly, the same technique for manufacturing a shoe sole can also be utilized to manufacture a material having a planar face, such as board or material used for construction, wall board, or the like. These materials have many industrial uses throughout the world. Rubber presents an opportunistic material to use in certain instances. First, rubber can be recycled from used tires to create a granular material that can be re-molded, thus providing ample raw material for use. Second, rubber has found numerous uses now in construction based upon its resilient properties and look. However, in certain instances, it may be necessary to modify the properties of the rubber to be more or less rigid, or that it may be used in instances wherein its ability to be used in construction is limited by its properties.

The rubber can be used, just as in the examples with the soles above, to create a mold that has a void having a volume that can be filled with a high density material. Depending on the structure of the material, different density materials can be utilized to increase or decrease the rigidity. However, certain density materials lack the necessary density to hold a fastener, like a nail, staple, screw or the like. By adding in a strip or strips of TPU having a sufficient density to hold such fasteners, would transform the material from a simple rubber material to a material having significant industrial properties.

Figure 7A:
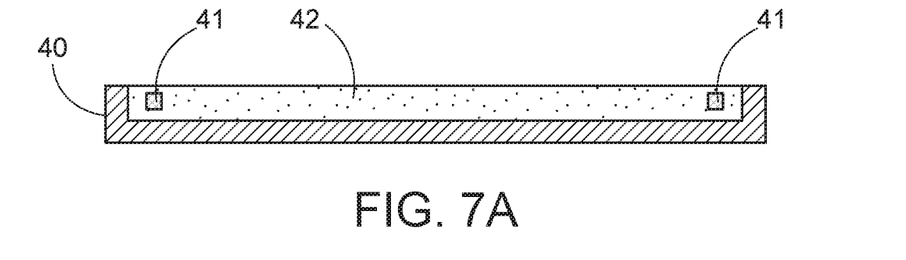
FIGS. 7A-7C depict a side profile and top perspective views of a rectangular rubber based structure, having a Rigid PU layer and TPU inscribed therein.
Figure 7B:
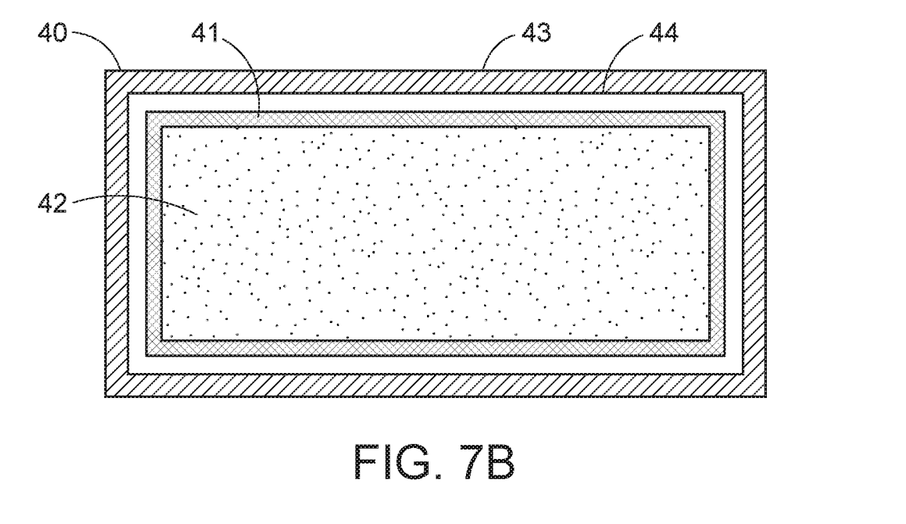
Figure 7C:
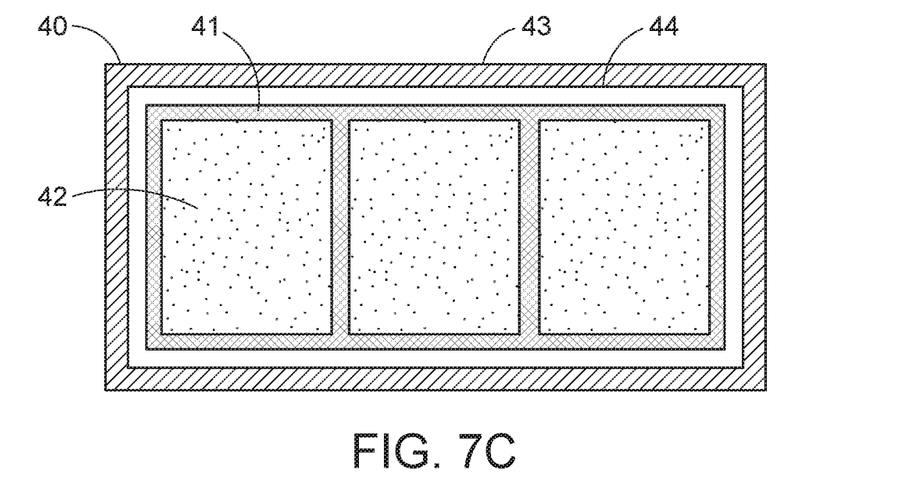

For example, FIGS. 7A-7C depicts a planar material. FIG. 7A shows a cross-sectional view of the FIG. 7B, which has an exterior rubber shell 40 and an inscribed TPU layer 41, with an expandable material 42 filling in the void created by the exterior rubber shell 40 which has an exterior 43 and interior 44 of the shell. By adding in an expandable material 42 and inscribing a high density strip of TPU 41, the weight of the entire material can be greatly reduced, yet at the same time giving a strip of material having sufficient rigidity (the TPU 41) to be stapled or nailed. For instance, if the material was molded into a typical 8'×4' sheet like plywood or dry wall, the TPU material 41 will greatly enhance its use in certain areas where a rubber layer (the exterior shell 40) would provide sound, vibration, moisture, or other properties native to the rubber. The TPU 41 then would allow further materials to be nailed to that material quickly and easily through the TPU strip 41 that is inscribed or otherwise positioned on the sheet.

The expandable material 42 would provide the appropriate flex, using a material having a greater or lower rigidity, and the weight can be adjusted by the particular density of the material.

FIG. 7C depicts a further embodiment having additional lateral supports on the TPU material 41. This provides for additional sections of rigid material for receiving a nail or a staple for the material. Thus, FIG. 7C being a sheet of rubber material could be nailed to the wall, with the entire perimeter receiving nails as well as the lateral strips in the middle.

What is claimed is:

1. A shoe sole comprising a rubber outsole having a concave opening filled with an expandable material having a first density; wherein the expandable material envelops a thermoplastic polyurethane (TPU) material and a rigid member, said TPU material having a second density that is greater than the first density, said TPU material being inscribed inside of the inner edge of the perimeter of the rubber outsole and, said rigid member enveloped between the heel and mid-sole portion of the sole.

2. The shoe sole of claim 1, wherein the expandable material is a rigid polyurethane (Rigid PU), having a density of between 0.25 g/cm$^3$ and 0.45 g/cm$^3$.

3. The shoe sole of claim 1, wherein the expandable material is a rigid polyurethane (Rigid PU), having a density of between 0.30 g/cm$^3$ and 0.35 g/cm$^3$.

4. The shoe sole of claim 1, wherein the TPU material has a density of between 1.15 g/cm$^3$ and 1.40 g/cm$^3$.

5. The shoe sole of claim 1, wherein the TPU material has a density of between 1.20 g/cm$^3$ and 1.30 g/cm$^3$.

6. The shoe sole of claim 1, wherein the rigid member is made of a material selected from the group consisting of steel, nylon, a metal alloy, a plastic polymer, or combinations thereof.

7. A material that is a shoe sole, the material having a rubber outer layer, the rubber outer layer defining a toe, midfoot and heel section, a Rigid PU filling, and an inscribed receiving material; said rubber outer layer having a first density and defining a concave receptacle having a top, sides, and a bottom; said rigid PU filling having a second density lower than the first density of the rubber outer layer and having properties to expand before solidifying; said inscribed receiving material having a third density, said third density being at least twice the density of the second density.

8. The material that is a shoe sole of claim 7, further comprising a rigid stabilizer, enveloped by the rigid PU filling, said rigid stabilizer extending from the heel section towards the toe portion of the sole.

9. The material that is a shoe sole of claim 7, wherein the expandable material is a rigid polyurethane (Rigid PU), having a density of between 0.25 g/cm$^3$ and 0.45 g/cm$^3$.

10. The material that is a shoe sole of claim 7, wherein the expandable material is a rigid polyurethane (Rigid PU), having a density of between 0.30 g/cm$^3$ and 0.35 g/cm$^3$.

11. The material that is a shoe sole of claim 7, wherein the TPU material has a density of between 1.15 g/cm$^3$ and 1.40 g/cm$^3$.

12. The material that is a shoe sole of claim 7, wherein the TPU material has a density of between 1.20 g/cm$^3$ and 1.30 g/cm$^3$.

13. The material that is a shoe sole of claim 7, wherein the expandable material has a Shore C hardness of between 85-90, and wherein the TPU material has a Shore D hardness of between 50 and 55.

14. The material that is a shoe sole of claim 7, wherein the rubber outer layer has a density of between 0.85 and 1.00 g/cm$^3$, and a Shore A harness of between 65 and 70.

15. The material that is a shoe sole of claim 7 manufactured in a planar sheet.

* * * * *